US006731950B1

(12) United States Patent
Giles (10) Patent No.: US 6,731,950 B1
(45) Date of Patent: May 4, 2004

(54) CELLULAR-BASED TELEPHONE CONNECTION SYSTEM

(75) Inventor: Rick D. Giles, Sandy, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/556,541

(22) Filed: Apr. 24, 2000

(51) Int. Cl.[7] ................................................. H04B 1/38
(52) U.S. Cl. ................. 455/556.1; 455/571; 455/575.6; 379/212
(58) Field of Search .............................. 455/556.1, 557, 455/571, 522, 462, 550.1, 555, 414.1, 465, 74.1; 379/212, 67.1, 210, 88.01, 428, 290.01

(56) References Cited

U.S. PATENT DOCUMENTS

| 5,479,485 A | * | 12/1995 | Hayashi ........................ 455/462 |
| 5,757,902 A | * | 5/1998 | Mitsuo .................... 379/212.01 |
| 5,995,591 A | * | 11/1999 | Halim ......................... 379/55.1 |
| 6,058,178 A | * | 5/2000 | McKendry et al. ..... 379/212.01 |
| 6,085,070 A | * | 7/2000 | Watanabe .................... 455/38.2 |
| 6,115,604 A | * | 9/2000 | Lester et al. .............. 455/422.1 |
| 6,269,248 B1 | * | 7/2001 | Jayawardene ................ 455/465 |
| 6,366,784 B1 | * | 4/2002 | Hsueh .......................... 455/462 |
| 6,498,938 B1 | * | 12/2002 | Morrow, Sr. ................. 455/557 |

* cited by examiner

Primary Examiner—Nay Maung
Assistant Examiner—Tilahun Gesesse
(74) Attorney, Agent, or Firm—Michaelson & Associates; Peter L. Michaelson; Janet M. Skafar (57) ABSTRACT

An interface box links a user's cellular telephone with all the standard telephone extensions at the user's home or office. In this way, the portable cellular telephone is the interface between the user's telephone extensions and the telephone company. The interface box connects to the cellular telephone's access connector, for example, whenever the cellular telephone is laid in a cradle of the interface box. Through this connector is sent all power, signal and input/output connections. In addition to the interface circuitry, the interface box preferably recharges the cellular telephone's battery.

27 Claims, 7 Drawing Sheets

CELLULAR-BASED TELEPHONE CONNECTION SYSTEM

BACKGROUND OF THE INVENTION

Cellular telephones provide individuals the ability to always be in communication with home or office even when traveling or commuting. Unfortunately, a person's cellular telephone number is different from his office or home number, so that he may not necessarily receive all of the telephone calls made to him. The regular telephone (i.e., non-cellular telephone) at the user's home or office typically includes a number of extensions for convenience and efficiency, enabling the user to go to different rooms in the office or home and still receive his calls, or permit someone else to answer the calls or screen the calls for the user. Therefore, the user typically de-activates his cellular telephone upon arrival at a particular location (home or office).

A typical problem of a one-man office is that the individual may need to give his clients or customers as many as two or three telephone numbers where he may be reached depending upon whether he is at home, at the office or in the car, for example. A customer or client may need to dial three different telephone numbers before reaching the individual. One feature designed to at least somewhat ameliorate this problem is call forwarding. However, call forwarding is not a real solution because it must be activated manually whenever the individual moves to another location and it must be deactivated manually when the individual returns. If the individual forgets to do this, he will be completely out of communication. Moreover, while in transit, the individual will receive no calls to the call-forwarded number until arriving at the call-forwarded location.

The same problems arise in any situation in which an individual has more than one location at which he must be reached at different times. For example, an individual may have a second home. More likely, an individual may have more than one office, each office having a different telephone number. This latter case may apply to an individual with his own business as well as a corporate employee who may need to work in different locations within a large office complex of the corporation.

SUMMARY OF THE DISCLOSURE

An interface box links a user's cellular telephone with all the standard telephone extensions at the user's home or office. In this way, the portable cellular telephone is the interface between the user's telephone extensions and the telephone company. The interface box connects to the cellular telephone's access connector, for example, whenever the cellular telephone is laid in a cradle of the interface box. Through this connector is sent all power, signal and input/output connections. In addition to the interface circuitry, the interface box preferably recharges the cellular telephone's battery.

Whenever the cellular telephone is thus connected to the interface box, each extension telephone at that location will act as though it were hard-wired to a normal telephone line. The extension telephones will look and act, to the user, just like the telephone system found in most homes or small offices, for example. The multiple extensions will all ring in response to an incoming call on the same telephone line.

With the invention, many locations frequented by the user (i.e., different private offices, different corporate offices, second homes, etc.) may be provided with such an interface box, so that as the user arrives at a given location he puts his cellular telephone into the interface box at that location, and upon departing he removes his cellular telephone from the interface box and takes it with him. Thus, the telephone extension system at each location is activated with the user's cellular telephone number as long as the user is there and is inactivated upon his departure.

DETAILED DESCRIPTION OF THE PREFERRED EMBODIMENTS

Figure 1:
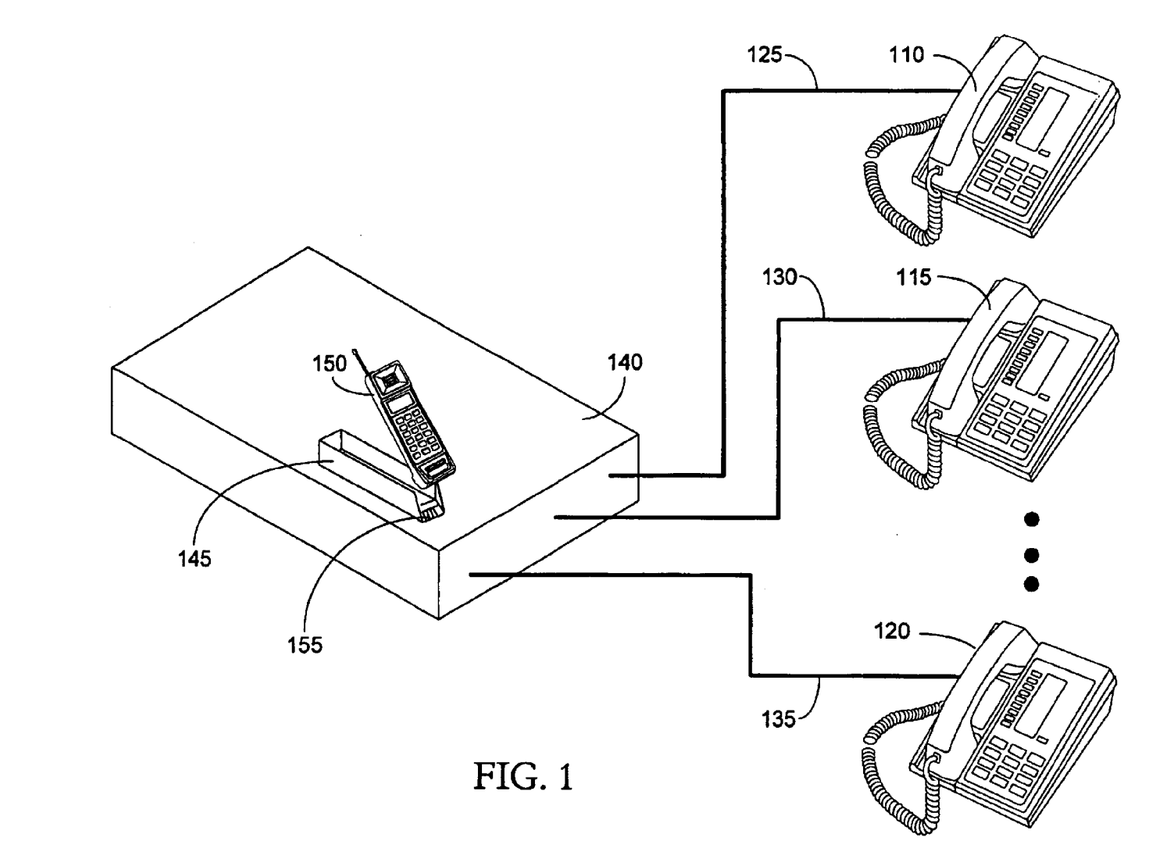
FIG. 1 is a pictorial schematic diagram illustrating a multiple extension telephone system embodying the invention.
Figure 2:
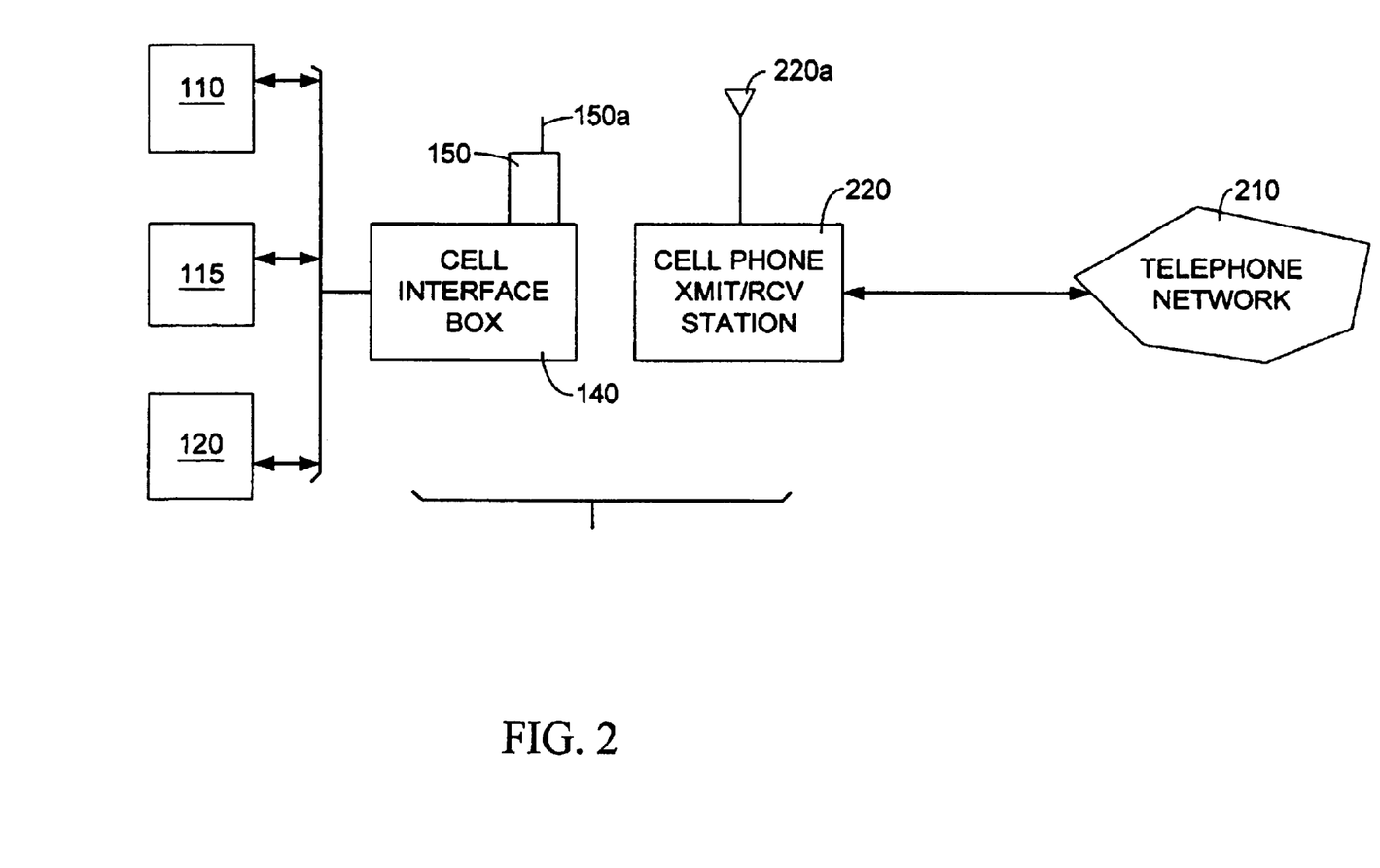
FIG. 2 is a schematic diagram illustrating the connection of the system of FIG. 1 to the telephone company network.

Referring to FIG. 1, fixed extension telephones 110, 115, 120, are connected through standard in-house telephone wiring lines 125, 130, 135 to an interface box or controller base 140. One of the extension telephones 110, 115, 120 may be replaced by a modem of the type used, for example, in a personal computer or facsimile machine. The controller base 140 has a cradle 145 which can receive a portable cellular telephone 150. The controller base cradle 145 has a cellular telephone connector 155 with a conductor pattern that matches external connectors on the cellular telephone 150. This pattern varies depending upon the manufacturer and model of the cellular telephone 150. The connector 155 can be transformed to conform to different connector patterns of different cell phone manufacturers or models by the use of different modular connector adapters (not shown in the drawings). Referring to FIG. 2, the cellular telephone 150 links the extension telephones 110, 115, 120, through the controller base 140 to the telephone company or telephone network 210 via the nearest cellular transmit/receive site 220. As employed in this specification, the term "telephone company" and the term "telephone network" both refer to the nationwide telephone system consisting primarily of local telephone company telephone wiring and long distance carrier microwave, fiber optic and wire links, as well as to the international calling access this system provides. Communication between the portable cellular telephone 150 and the cellular site 220 is through radio propagation between the antenna 150a of the cellular telephone 150 and the antenna 220a of the cell site 220. Multiple RJ-11 connectors are provided on the controller box 140 to which the various extension telephones 110, 115, 120 may be connected. The extension telephones 110, 115, 120 all respond to incoming calls to the telephone number of the portable cellular telephone 150, and make calls on this same telephone number. FIG. 2 illustrates an alternative embodiment of the controller base 140 in which the controller base 140 has a single line connector and the fan-out from this connector to multiple RJ-11 connectors in the house/office walls is provided externally of the controller base 140, e.g., by in-house telephone wiring.

Figure 3:
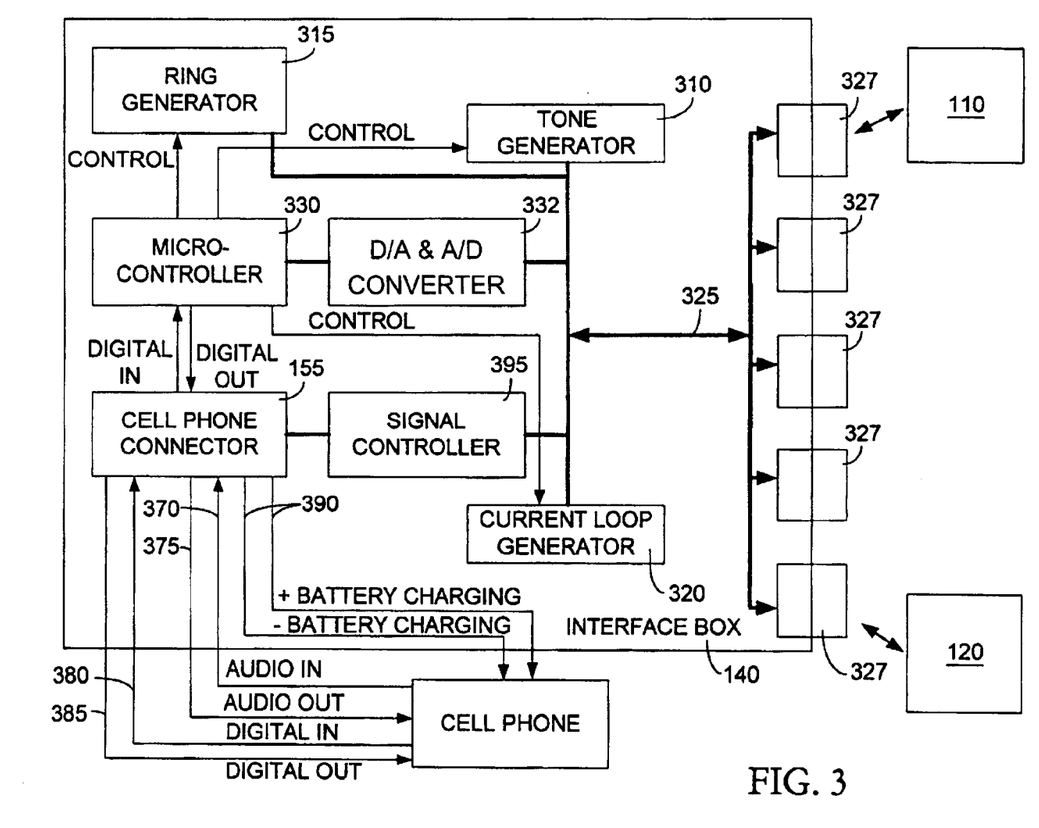
FIG. 3 is a schematic diagram illustrating a preferred embodiment of the interface box employed in the system of FIG. 1.

The internal structure of the interface box or controller base 40 is illustrated in FIG. 3. The controller base 140 provides the ring voltage, tone signal and loop current necessary for the extension telephones 110, 115, 120 to function, in the manner of a conventional telephone line simulator of the type well-known in the art. For this purpose, the controller base 140 includes three basic elements found in a telephone line simulator, namely a tone generator 310, a ring generator 315 and a current loop generator 320, all connected to a common two-conductor standard telephone line bus 325. The telephone line bus is connected in common to plural external telephone jacks 327, which are preferably RJ-11 connectors, to which the extension telephones or a modem may be connected. As in a conventional telephone line simulator, the current loop generator 320 provides a standard telephone on-hook line voltage (e.g., typically −20V to −48V), the tone generator 310 provides the dial tone upon detecting an off-hook condition of any telephone connected to the telephone line bus 325, while the ring generator generates the requisite voltage (e.g., typically 90 volts AC) to ring a telephone upon command (i.e., whenever an incoming call is received). Conventionally, an off-hook condition is detected by or for the tone generator 310 by sensing a change in the line voltage from, typically, −48V to −10V due to a typical 20 mA current through the telephone that has been taken off-hook. In addition to these conventional elements, the controller base 140 further includes a microcontroller 330 as well as the cellular telephone connectors 155 referred to above with reference to FIG. 1. In a preferred embodiment of the invention, the microcontroller 330 controls the tone generator 310, the ring generator 315 and the current loop generator 320 in-response to signals (e.g., digital codes) received from the cellular telephone 150. Furthermore, the microcontroller 330 responds to signals from the extension telephones 110, 115, 120 (e.g., off-hook line voltage drop, tone-dial numbers) to issue control commands to the cellular telephone 150. These functions of the microcontroller 330 are discussed in detail below. The microcontroller 330 senses signals such as DTMF tones from the extension telephones 110, 115, 120 through an analog-to-digital conversion interface 332 connected between the telephone line bus 325 and the microcontroller 330. In one implementation, the microcontroller 330 employs fast Fourier transforms to decode the DTMF frequencies, for example, although the invention is not limited to such an implementation. The microcontroller 330 senses the off-hook and on-hook line voltages either through the analog-to-digital conversion interface 332, or through conventional telephone interface circuitry of the type well-known in the art (not shown in the drawing). In a preferred embodiment, the cellular telephone connector 155 includes an audio-in connection 370, an audio-out connection 375, a digital-in connection 380 and a digital-out connection 385. The cellular telephone connector 155 may provide a path for both the audio-out connection 375 and the audio-in connection 370 to the telephone line bus 325, with signal conditioning elements in the path which are discussed later in this specification. Alternatively, depending upon the design of the particular cellular telephone, there may be only a single audio connection, namely an audio-in/out connection, which the cellular telephone connector therefore connects to the telephone line bus 325. In addition, the connector 155 includes positive, negative and/or ground battery charging connectors 390 to charge the cellular telephone's rechargeable battery. A signal conditioner 395 adjusts the voltage and current characteristics of the signals (e.g., the audio signals) received from the cellular telephone 150 for transmission to the extension telephones 110, 115, 120. It also adjusts the voltage and current, characteristics of the signals (e.g., the audio signals) received from the extension telephones 110, 115, 120 for transmission to the cellular telephone 150. These changes are necessary because typically the required voltage and current levels for audio signals sent or received by the cellular telephone 150 are different from those sent or received by the extension telephones 110, 115, 120. Such changes may include not only changing voltage levels but also the removal of the DC line voltage (e.g., −48V) from the audio signal sent to the cellular telephone 150 and removal of any ring voltage or AC dial tone signal or side tone, if necessary. The required changes in voltage and current levels to be performed by the signal conditioner 395 are determined by referring to the manufacturer's specifications of the particular cellular telephone 150.

Figure 4:
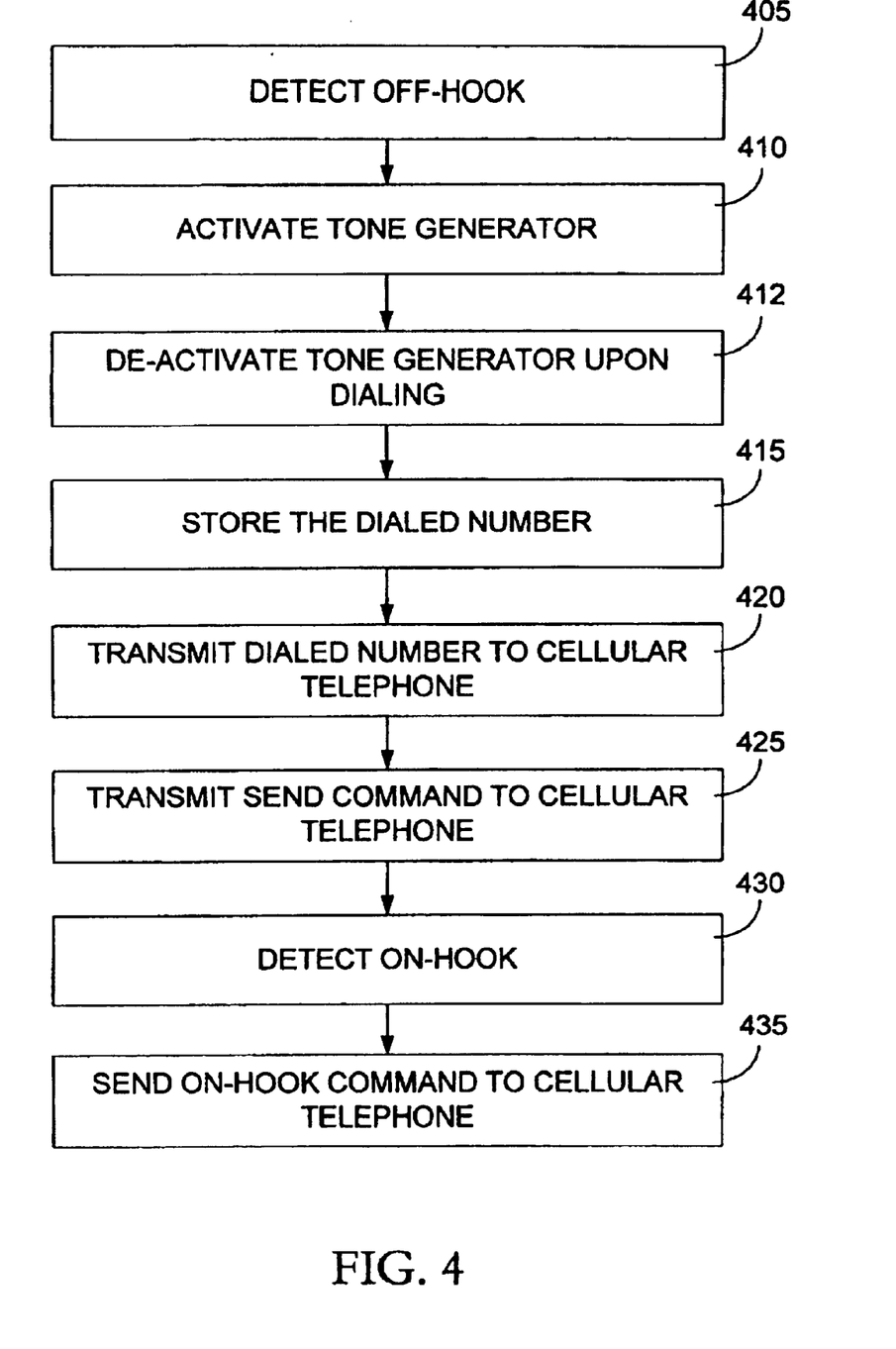
FIG. 4 is a block diagram illustrating a first mode of the operation of the microprocessor in the interface box of FIG. 3.

FIG. 4 illustrates the operation of the microcontroller 330 when a telephone call is made from one of the extension telephones 110, 115, 120. The microcontroller 330 detects (e.g., through the analog-to-digital converter 332) that one of the extension telephones 110, 115, 120 is off-hook (block 405 of FIG. 4), and in response actuates the tone generator 310 (block 410). Alternatively, the tone generator 310 itself may be sufficiently intelligent to appropriately activate itself. More preferably, the microcontroller 330 is programmed to delay the activation of the tone generator 330 until the microcontroller 330 detects that the cellular telephone has service or an RF carrier. As soon as the user begins dialing a number (e.g., by entering the number on a DTMF pad), the tone generator 310 is deactivated by the microcontroller 330 or deactivates itself (block 412). Thus, the tone generator 310 only generates a dial tone after an extension is taken off-hook and until the user begins dialing. The microcontroller 330 senses through the analog-to-digital converter device 332 a sequence of numbers corresponding to the DTMF tones produced as a user dials a telephone number on one of the extension telephones and stores the numbers as the number to be dialed (block 415). (Alternatively, the DTMF tones may be sensed or decoded by means other than the analog-to-digital converter device 332, such as a phase-locked loop, for example.) The microcontroller 330 preferably has been programmed to recognize in accordance with conventional techniques when a complete telephone number has been dialed or entered. For example, in the simplest but least preferred scheme, it would simply detect that the user has stopped dialing after a pause of some predetermined amount of time. More preferably, it may require entry of a particular number of digits depending upon whether the number is preceded by a 1 or a 0 or a 011, and so forth. After the microcontroller 330 detects that a complete telephone number has been entered, the microcontroller 330 sends the dialed telephone number on the digital out connection 385 to the cellular telephone 150 (block 420) along with a digital "off-hook" or, equivalently, a "send" command (block 425). The "send" command causes the cellular telephone to go "off-hook" and dial the number on the telephone network. At this point, the extension telephone functions as a normal telephone on the telephone network. When the user hangs up the extension telephone, the microcontroller 330 detects the return of the line voltage or current to the "on-hook" level (e.g., −20V to −48V typically) (block 430) and in response sends a digital "hang-up" ("end") command on the digital out connection 385 to the cellular telephone 150 (block 435).

Figure 5:
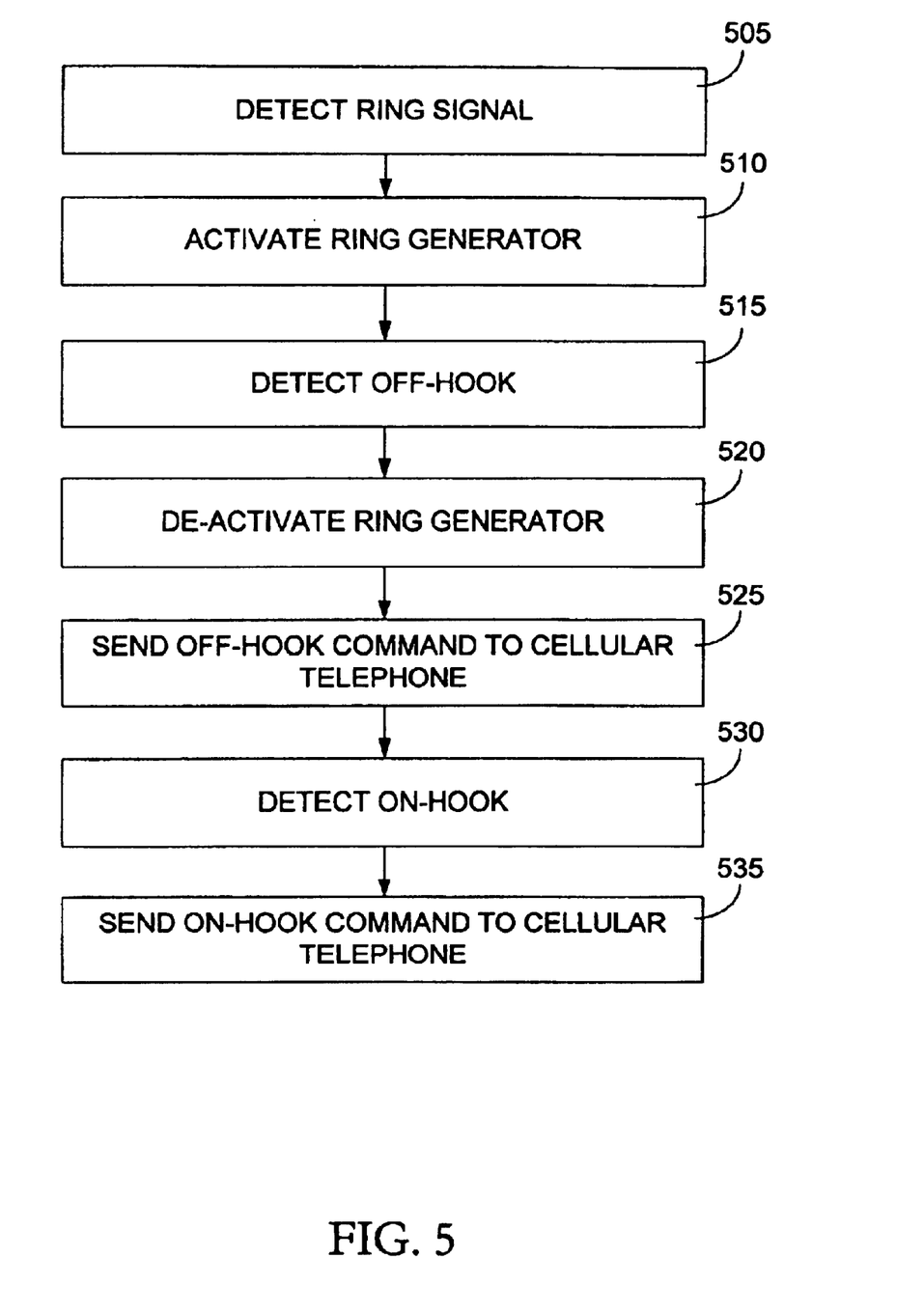
FIG. 5 is a block diagram illustrating a second mode of the operation of the microprocessor in the interface box of FIG. 3.

FIG. 5 illustrates the operation of the microcontroller 330 when an incoming telephone call is made via the telephone network to the cellular telephone 150. The microcontroller 330 detects on the digital in connection 380 a digital ring signal from the cellular telephone 150 (block 505 of FIG. 5). In response, the microcontroller 330 activates the ring generator 315 (block 510). If the user then picks up one of the extension telephones 110, 115, 120, the microcontroller 330 detects an off-hook condition (block 515), and responds by de-activating the ring generator 315 (block 520) and generating a digital "off-hook" command on the digital out connection 385 (block 525) to the cellular telephone 150. (This is like pushing the SEND button on a cellular phone when it rings.) During the ensuing telephone conversation, the audio signals are passed back and forth for full audio duplex communication between the cellular telephone and the extension telephone (110, 115, 120) held off-hook by the user. As soon as the user hangs up the extension telephone, the microcontroller 330 detects an on-hook condition (block 530) and the microcontroller 330 issues a digital "on-hook" command hang-up) on the digital out connection 385 to the cellular telephone 150 (block 535). The microcontroller is preferably programmed to respond to a digital indication from the cellular telephone that the incoming caller has hung up or that the RF carrier to the cellular telephone has been lost to re-activate the tone generator 310 to give the user a dial tone.

In summary, FIGS. 4 and 5 show that the portable cellular telephone 150 is slaved by the base controller to the extension telephones so that the cellular telephone goes "on-hook" and "off-hook" in response to one of the extension telephones going on-hook and off-hook and dials a number dialed by a user on one of the extension telephones. Moreover, the base controller renders the extension telephones responsive to the cellular telephone in that they ring upon a call being received by the portable cellular telephone 150.

The microcontroller 330 performs the foregoing functions under the control of internal firmware programmed in conventional manner in accordance with the processes of FIGS. 4 and 5. Alternatively, the microcontroller 330 may be dedicated logic programmed or "configured" in a conventional manner, e.g., in the manner of field programmable gate arrays, to perform the foregoing functions.

While the microcontroller 330 has been described as interpreting DTMF dial tones through the analog-to-digital converter 332, it may also be programmed to interpret pulse-dialing signals from the extension telephones through the analog-to-digital converter 332 or another suitable device using conventional techniques well-known in the art.

In addition to the digital signals received by the microcontroller on the digital in connection 380 and the digital commands issued by the microcontroller on the digital out connection 385, other signals optionally may be accommodated as well. For example, the microcontroller 330 may receive from the cellular telephone 150, certain information for display on an electronic display that may be provided on the controller base 140, for example. This information would be received on the digital in line 380 and may include caller ID, signal strength, time, date, duration of call, and other information normally available from the cellular telephone 150.

Digital commands transmitted by the controller base 140 to the cellular telephone 150 include those enumerated above and may additionally include a digital mute command (so that the cellular telephone's microphone and speaker does not broadcast an on-going conversation), and a re-dial command. Moreover, if the cellular telephone 150 is highly sophisticated and has a memory and a menu of options, the commands may also include any or all of the commands required to operate the cellular telephone's menu of options. For this purpose, either the controller base 140 or the extension telephones 110, 115, 120 would need the various keypad functions required to operate the cellular telephone's menu (e.g., recall, AutoDial, telephone directory, forward, back, etc., depending upon the manufacturer and model).

Figure 6:
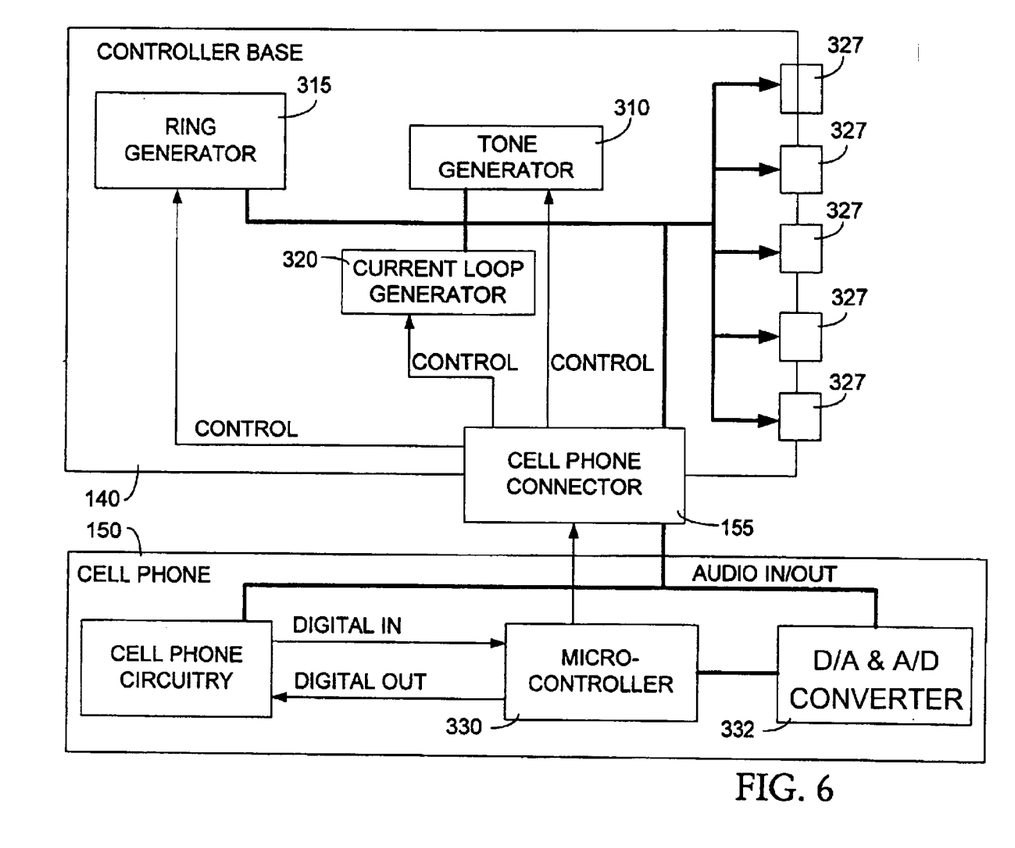
FIG. 6 is a schematic diagram of a first alternative embodiment of the invention.
Figure 7:
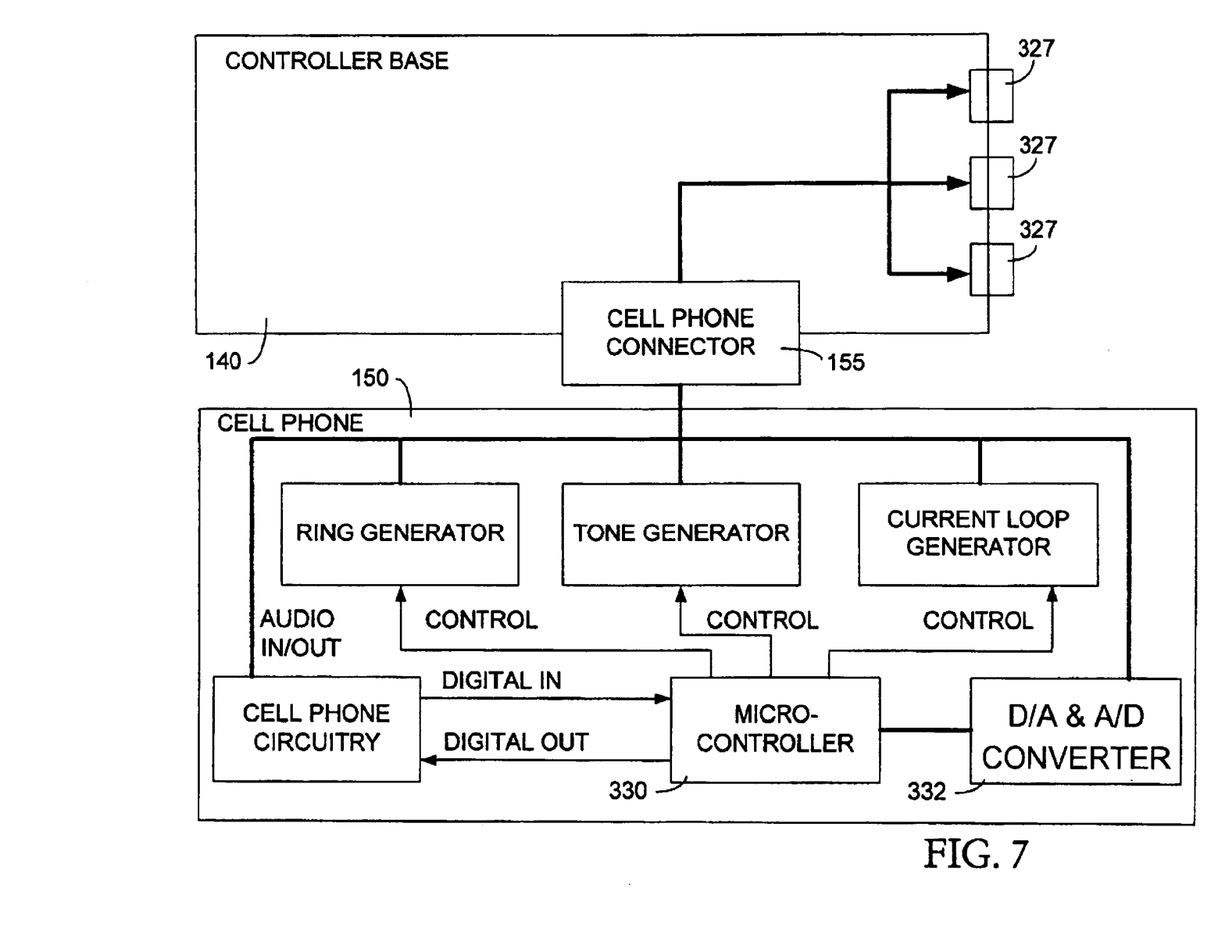
FIG. 7 is a schematic diagram of a second alternative embodiment of the invention.

In other embodiments of the invention, the key elements of the controller base 140, such as the microcontroller 330 and the digital-to-analog converter 332, may be placed inside a modified version 150' of the cellular telephone 150. For example, FIG. 6 illustrates such an embodiment in which the tone generator 310, the ring generator 315 and the current loop generator 320 are in the controller base 140 while the microcontroller 330 and the digital-to-analog converter 332 are both on-board the modified cellular telephone 150'. In some cases, the converter 332 may have both digital-to-analog conversion capability and analog-to-digital conversion capability, each of which may be required depending upon the particular operation. In FIG. 6, the circuitry comprising the standard cellular telephone 150 of FIG. 3 is contained in the box labelled "cell phone circuitry" inside the modified cellular telephone 150' of FIG. 6. Furthermore, as illustrated in FIG. 7, more or even possibly all of the active circuit elements within the controller base 140 of FIG. 3 may be placed instead inside the modified cellular telephone 150', leaving the telephone extension connectors 327 and the cellular telephone connector 155 on the controller base 140. In the embodiments of FIGS. 6 and 7, the cellular telephone connector 155 includes a power connector (not shown in FIGS. 6 and 7) for furnishing electrical power to the modified cellular telephone 150' to charge its battery. In the embodiments of FIGS. 6 and 7, all of the connections illustrated in FIG. 3 are present, the difference being that many of the elements being connected reside inside the modified cellular telephone 150' rather than the controller base 140. For example, in the alternative embodiment of FIG. 6, the microcontroller 330 and the digital-to-analog (and analog-to-digital) converter 332 and the connections thereto are inside the modified cellular telephone 150'. Furthermore, in the alternative embodiment of FIG. 7, all of the active elements as well as the connections thereto are inside the modified cellular telephone 150'.

While the invention has been described in detail by specific reference to preferred embodiments, it is understood that variations and modifications may be made without departing from the true spirit and scope of the invention.

What is claimed is:

1. A base controller for linking extension telephones to a telephone network through a portable cellular telephone, said base controller comprising:

an extension telephone connector for connection to said external telephones;

a telephone line simulator connected to the extension telephone connector;

a cellular telephone connector for connecting to external connections provided on the portable cellular telephone, said cellular telephone connector including an audio line connection coupled between said cellular telephone and said extension telephone connector to enable duplex voice communication between the cellular telephone and the extension telephones;

a microcontroller responsive to the cellular telephone and responsive to the extension telephones and programmed to cause at least one of:

(a) a ring signal to be generated by said telephone line simulator upon receipt of a ring signal from said cellular telephone, (b) said cellular telephone to connect and disconnect from the telephone network as said extension telephones go off-hook and on-hook, (c) said cellular telephone to dial a number dialed from one of said extension telephones;

wherein said cellular telephone connector comprises a digital-in connection for carrying command signals from the cellular telephone to said microcontroller, a digital-out connection for carrying command signals from said microcontroller to the cellular telephone, an audio in connection for carrying audio signals from the cellular telephone to said extension telephone connector and an audio out connection for carrying audio signals from said extension telephone connector to the cellular telephone.

2. The base controller of claim 1 wherein said microcontroller is programmed to cause each of (a), (b) and (c).

3. The base controller of claim 1 further comprising a cradle for supporting the portable cellular telephone, said cellular telephone connector being located so as to contact said external connections on the portable cellular telephone whenever the cellular telephone is appropriately placed in said cradle.

4. The base controller of claim 3 wherein said cellular telephone connector connects to a battery charging port of the cellular telephone.

5. The base controller of claim 1 wherein said telephone line simulator comprises a current loop generator, a tone generator and a ring generator.

6. The base controller of claim 5 wherein said tone generator provides a dial tone to said telephone extension connector upon one of said extensions being taken off-hook in the absence of an incoming telephone call and prior to a number being dialed on the one extension telephone.

7. The base controller of claim 6 wherein said microcontroller activates said ring generator upon receipt of a ring signal from the portable cellular telephone.

8. The base controller of claim 1 further comprising signal condition circuitry for coupling said audio-in and audio-out connections to said extension telephone connector.

9. A method of coupling an internal telephone set to an external telephone network using a portable cellular telephone having access to the external telephone network, said method comprising:

linking said portable cellular telephone to said internal telephone so as to enable full duplex audio communication between said internal telephone set and said external telephone network via said cellular telephone;

controlling said portable cellular telephone to go on-hook and off-hook with said external telephone network in response to said internal telephone set going on-hook and off-hook respectively;

wherein said cellular telephone connector comprises a digital-in connection for carrying command signals from the cellular telephone to said microcontroller, a digital-out connection for carrying command signals from said microcontroller to the cellular telephone, an audio in connection for carrying audio signals from the cellular telephone to said extension telephone connector and an audio out connection for carrying audio signals from said extension telephone connector to the cellular telephone.

10. The method of claim 9 further comprising:

further controlling said portable cellular telephone to dial a number on said external telephone network after the number has been dialed on said internal telephone set.

11. The method of claim 10 further comprising:

controlling said internal telephone set to ring upon receipt of a telephone call from said external telephone network by said portable cellular telephone.

12. A base controller comprising:

a telephone extension connector;

a cellular telephone connector;

a duplex audio signal connection between said telephone extension connector and said cellular telephone connector; and a microcontroller programmed to generate off-hook and on-hook commands to said cellular telephone connector in response to off-hook and on-hook conditions sensed on said telephone extension connector;

wherein said cellular telephone connector comprises a digital-in connection for carrying command signals from the cellular telephone to said microcontroller, a digital-out connection for carrying command signals from said microcontroller to the cellular telephone, an audio in connection for carrying audio signals from the cellular telephone to said extension telephone connector and an audio out connection for carrying audio signals from said extension telephone connector to the cellular telephone.

13. The base controller of claim 12 wherein:

said microcontroller is further programmed to cause a ring signal to be sent to said telephone extension connector in response to a ring signal received via said cellular telephone connector.

14. The base controller of claim 12 wherein:

said microcontroller is further programmed to store a telephone number received from the telephone extension connector and send the telephone number and a dial command to said cellular telephone connector.

15. A single-number multi-location telephone system for use with an external telephone network, comprising:

plural telephone sets at respective plural locations, each of said plural telephone sets being independent;

plural base controllers at said respective plural locations and individually connected to corresponding ones of said telephone sets, each of said plural base controllers having a cellular telephone connector through which said base controller links the corresponding telephone set to said external telephone network through said cellular telephone connector;

each of said plural base controllers comprising a microcontroller for slaving a portable cellular telephone connected to said cellular telephone connector to the corresponding telephone set;

wherein said cellular telephone connector comprises a digital-in connection for carrying command signals from the cellular telephone to said microcontroller, a digital-out connection for carrying command signals from said microcontroller to the cellular telephone, an audio in connection for carrying audio signals from the cellular telephone to said extension telephone connector and an audio out connection for carrying audio signals from said extension telephone connector to the cellular telephone.

16. The telephone system of claim 15 wherein at least one of said telephone sets comprises plural extension telephones connected to a common extension telephone wiring system of the corresponding location.

17. The telephone system of claim 16 wherein said one telephone set further comprises a modem.

18. Apparatus in which extension telephones are linked to a telephone network through a portable cellular telephone, said apparatus comprising:
- an extension telephone connector for connection to said external telephones;
- telephone line simulator connected to the extension telephone connector;
- a cellular telephone connector for connecting to external connections provided on the portable cellular telephone, said cellular telephone connector including an audio line connection coupled between the cellular telephone and said extension telephone connector to enable duplex voice communication between the cellular telephone and the extension telephones;
- said cellular telephone comprising:
  - a microcontroller responsive to the extension telephones and programmed to cause at least one of:
    - (a) a ring signal to be generated by said telephone line simulator upon receipt of a ring signal from the cellular telephone,
    - (b) the cellular telephone to connect and disconnect from the telephone network as the extension telephones go off-hook and on-hook,
    - (c) the cellular telephone to dial a number dialed from one of the extension telephones.

19. The apparatus of claim 18 wherein said telephone line simulator resides inside the cellular telephone.

20. The apparatus of claim 18 wherein said microcontroller is programmed to cause each of (a), (b) and (c).

21. The apparatus of claim 18 further comprising a cradle for supporting the portable cellular telephone, said cellular telephone connector being located so as to contact said external connections on the portable cellular telephone whenever the cellular telephone is appropriately placed in said cradle.

22. The apparatus of claim 21 wherein said cellular telephone connector connects to a battery charging port of the cellular telephone.

23. The apparatus of claim 18 wherein said telephone line simulator comprises a current loop generator, a tone generator and a ring generator.

24. The apparatus of claim 23 wherein said tone generator provides a dial tone to said telephone extension connector upon one of the extension telephones being taken off-hook in the absence of an incoming telephone call and prior to a number being dialed on the one extension telephone.

25. The apparatus of claim 24 wherein said microcontroller activates said ring generator upon receipt of a ring signal from said portable cellular telephone.

26. The apparatus of claim 18 wherein said cellular telephone connector comprises an audio in connection for carrying audio signals from the cellular telephone to said extension telephone connector and an audio out connection for carrying audio signals from said extension telephone connector to the cellular telephone.

27. The apparatus of claim 26 further comprising signal condition circuitry for coupling said audio-in and audio-out connections to said extension telephone connector.

* * * * *